(12) United States Patent
Song et al.

(10) Patent No.: US 11,064,053 B2
(45) Date of Patent: *Jul. 13, 2021

(54) METHOD, APPARATUS AND SYSTEM FOR PROCESSING DATA

(71) Applicant: BEIJING BAIDU NETCOM SCIENCE AND TECHNOLOGY CO., LTD., Beijing (CN)

(72) Inventors: Shuangyang Song, Beijing (CN); Xianhui Niu, Beijing (CN); Li Li, Beijing (CN); Linjiang Lian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,930

(22) Filed: Sep. 11, 2019

(65) Prior Publication Data
US 2020/0204652 A1 Jun. 25, 2020

(30) Foreign Application Priority Data
Dec. 21, 2018 (CN) .............................. 201811574618

(51) Int. Cl.
| | |
|---|---|
| G06F 16/23 | (2019.01) |
| H04L 29/06 | (2006.01) |
| G06F 16/22 | (2019.01) |
| H04L 29/08 | (2006.01) |
| G06F 16/953 | (2019.01) |

(52) U.S. Cl.
CPC .......... *H04L 67/42* (2013.01); *G06F 16/2246* (2019.01); *G06F 16/2379* (2019.01); *G06F 16/953* (2019.01); *H04L 67/1023* (2013.01); *H04L 67/2804* (2013.01)

(58) Field of Classification Search
CPC ............................ H04L 67/42; G06F 16/2246
USPC ........................................................ 709/203
See application file for complete search history.

(56) References Cited

U.S. PATENT DOCUMENTS

| | | | | |
|---|---|---|---|---|
| 2009/0248895 | A1* | 10/2009 | Archer ................. | H04L 12/413 709/241 |
| 2013/0042307 | A1* | 2/2013 | Imamura ................ | H04L 69/28 726/4 |

FOREIGN PATENT DOCUMENTS

| | | |
|---|---|---|
| CN | 105068758 | 11/2015 |
| CN | 106909557 | 6/2017 |
| CN | 106953893 | 7/2017 |

(Continued)

*Primary Examiner* — Sibte H Bukhari
(74) *Attorney, Agent, or Firm* — Knobbe, Martens, Olson & Bear LLP (57) ABSTRACT

Embodiments of the present disclosure relate to a method and an apparatus for processing data. The method can include: determining, in response to receiving an access request, a time interval between the access request and a last access request as a first time interval; acquiring a preset complete binary tree from a management server end, a value of a non-leaf node of the complete binary tree being related to a time interval of latest two access requests received by a metadata server, a leaf node being used to represent a virtual node in a distributed system, and the virtual node corresponding to the metadata server; selecting a target path from the complete binary tree according to the first time interval; and sending the access request and the target path to a metadata server corresponding to a leaf node of the target path.

6 Claims, 6 Drawing Sheets

(56) References Cited

FOREIGN PATENT DOCUMENTS

| JP | 2006302305 | A | 11/2006 |
| JP | 2012134780 | A | 7/2012 |
| WO | WO2004092971 | A1 | 10/2004 |

* cited by examiner

```
                                                          500
┌────────────────────────────────────────────────────┐  ╱ 501
│ updating, in response to receiving a change amount │ ╱
│ of a value of a node in a complete binary tree sent│
│ by at least one metadata server end, the complete  │
│ binary tree according to the received change amount│
│ of the value of the node                           │
└────────────────────────────────────────────────────┘
                          │
                          ▼
┌────────────────────────────────────────────────────┐  ╱ 502
│ sending, in response to receiving a request sent by│ ╱
│ a client for acquiring the complete binary tree,   │
│ the complete binary tree to the client             │
└────────────────────────────────────────────────────┘
```

METHOD, APPARATUS AND SYSTEM FOR PROCESSING DATA

CROSS-REFERENCE TO RELATED APPLICATIONS

This application claims priority to Chinese Patent Application No. 201811574618.3, filed on Dec. 21, 2018, titled "Method, Apparatus and System for Processing Data," which is hereby incorporated by reference in its entirety.

TECHNICAL FIELD

Embodiments of the present disclosure relate to the field of computer technology, and specifically to a method, apparatus and system for processing data.

BACKGROUND

A file system, as a data storage form in the computer field, has long served in computer application systems of all walks of life. However, with the explosive growth of data volume, a distributed file system based on a computer cluster has emerged. In the design of such a large-scale distributed file system, a separate metadata processing node is required to be responsible for managing meta information of the entire file system. When the number of files or directories reaches billion or even ten billion, the load of a metadata node becomes the biggest bottleneck of the system. Existing load balancing approaches from an approach for fixedly configuring a number of sub-directories of each metadata server service to an approach for performing mapping through a hash table are effective approaches to performing load balancing. In addition, an open source distributed file system also proposes a dynamic subtree partitioning approach. By monitoring the access load of each directory in the file system, the subdirectory tree for which each metadata server is responsible is dynamically adjusted.

These methods are developed through constant practice, but they also have their own defects and scopes of application. Here, the static configuration approach is not suitable for a scenario where the data access location is fixed, and at the same time is not so competent in addressing an abnormal situation. The hash table mapping approach is not suitable for a scenario where data distribution is fixed and an environment changes frequently. In addition, the dynamic partitioning approach only monitors the load of the system, and thus, the made partitioning decision and the made migration decision are not necessarily accurate. Therefore, the load level of the system cannot be fully depicted.

SUMMARY

Embodiments of the present disclosure propose a method, apparatus and system for processing data.

In a first aspect, some embodiments of the present disclosure provide a method for processing data, applied to a client. The method includes: determining, in response to receiving an access request, a time interval between the access request and a last access request as a first time interval; acquiring a preset complete binary tree from a management server end, a value of a non-leaf node of the complete binary tree being related to a time interval of latest two access requests received by a metadata server, a leaf node being used to represent a virtual node in a distributed system, and the virtual node corresponding to the metadata server; selecting a target path from the complete binary tree according to the first time interval; and sending the access request and the target path to the metadata server corresponding to the leaf node of the target path.

In some embodiments, the selecting a target path from the complete binary tree according to the first time interval includes: for a node in the complete binary tree, determining, if the first time interval is smaller than a value of the node, a child node at a predetermined side of the node as a target node; and using the determined target node to form the target path.

In some embodiments, the sending the access request to the metadata server corresponding to the leaf node of the target path includes: determining, through a preset consistent hash ring, the target metadata server to which the leaf node of the target path is mapped; and sending the access request to the target metadata server.

In a second aspect, some embodiments of the present disclosure provide a method for processing data, applied to a metadata server end. The method includes: determining, in response to receiving an access request sent by a client and a target path in a complete binary tree, a time interval between the access request and a last access request as a second time interval, a value of a non-leaf node of the complete binary tree being related to a time interval of latest two access requests received by a metadata server, a leaf node being used to represent a virtual node in a distributed system, and the virtual node corresponding to the metadata server; determining a change amount of a value of a node in the complete binary tree according to the target path and the second time interval; querying an access result according to the access request, and sending the access result to the client; and sending the change amount of the value of the node in the complete binary tree to a management server end.

In some embodiments, the determining a change amount of a value of a node in the complete binary tree according to the target path and the second time interval includes: determining a first weighted value of the second time interval as a decrement of a value of a node on the target path, the first weighted value being a product of the second time interval and a first predetermined weight; and determining a second weighted value of the second time interval as an increment of a value of a node on a symmetric path of the target path, the second weighted value being a product of the second time interval and a second predetermined weight.

In a third aspect, some embodiments of the present disclosure provide a method for processing data, applied to a management server end. The method includes: updating, in response to receiving a change amount of a value of a node in a complete binary tree sent by at least one metadata server end, the complete binary tree according to the received change amount of the value of the node, a value of a non-leaf node of the complete binary tree being related to a time interval of latest two access requests received by a metadata server, a leaf node being used to represent a virtual node in a distributed system, and the virtual node corresponding to the metadata server; and sending, in response to receiving a request sent by a client for acquiring the complete binary tree, the complete binary tree to the client.

In a fourth aspect, some embodiments of the present disclosure provide an apparatus for processing data, applied to a client. The apparatus includes: a first timing unit, configured to determine, in response to receiving an access request, a time interval between the access request and a last access request as a first time interval; an acquiring unit, configured to acquire a preset complete binary tree from a management server end, a value of a non-leaf node of the complete binary tree being related to a time interval of latest two access requests received by a metadata server, a leaf node being used to represent a virtual node in a distributed system, and the virtual node corresponding to the metadata server; a selecting unit, configured to select a target path from the complete binary tree according to the first time interval; and a first sending unit, configured to send the access request and the target path to the metadata server corresponding to the leaf node of the target path.

In some embodiments, the selecting unit is further configured to: for a node in the complete binary tree, determine, if the first time interval is smaller than a value of the node, a child node at a predetermined side of the node as a target node; and use the determined target node to form the target path.

In some embodiments, the first sending unit is further configured to: determine, through a preset consistent hash ring, the target metadata server to which the leaf node of the target path is mapped; and send the access request to the target metadata server.

In a fifth aspect, some embodiments of the present disclosure provide an apparatus for processing data, applied to a metadata server end. The apparatus includes: a second timing unit, configured to determine, in response to receiving an access request sent by a client and a target path in a complete binary tree, a time interval between the access request and a last access request as a second time interval, a value of a non-leaf node of the complete binary tree being related to a time interval of latest two access requests received by a metadata server, a leaf node being used to represent a virtual node in a distributed system, and the virtual node corresponding to the metadata server; a determining unit, configured to determine a change amount of a value of a node in the complete binary tree according to the target path and the second time interval; a second sending unit, configured to query an access result according to the access request, and send the access result to the client; and a third sending unit, configured to send the change amount of the value of the node in the complete binary tree to a management server end.

In some embodiments, the determining unit is further configured to: determine a first weighted value of the second time interval as a decrement of a value of a node on the target path, the first weighted value being a product of the second time interval and a first predetermined weight; and determine a second weighted value of the second time interval as an increment of a value of a node on a symmetric path of the target path, the second weighted value being a product of the second time interval and a second predetermined weight.

In a sixth aspect, some embodiments of the present disclosure provide an apparatus for processing data, applied to a management server end. The apparatus includes: an updating unit, configured to update, in response to receiving a change amount of a value of a node in a complete binary tree sent by at least one metadata server end, the complete binary tree according to the received change amount of the value of the node, a value of a non-leaf node of the complete binary tree being related to a time interval of latest two access requests received by a metadata server, a leaf node being used to represent a virtual node in a distributed system, and the virtual node corresponding to the metadata server; and a downloading unit, configured to send, in response to receiving a request sent by a client for acquiring the complete binary tree, the complete binary tree to the client.

In a seventh aspect, some embodiments of the present disclosure provide a system for processing data. The system includes: a client, configured to: determining, in response to receiving an access request, a first time interval between the access request and a last access request received by the client, acquire a preset complete binary tree from a management server end, select a target path from the complete binary tree according to the first time interval, and send the access request and the target path to a metadata server corresponding to a leaf node of the target path, a value of a non-leaf node of the complete binary tree being related to a time interval of latest two access requests received by a metadata server, a leaf node being used to represent a virtual node in a distributed system, and the virtual node corresponding to the metadata server; at least one metadata server, configured to: determine, in response to receiving an access request sent by the client and the target path in the complete binary tree, a second time interval between the access request sent by the client and a last access request received by the metadata server, determine a change amount of a value of a node in the complete binary tree according to the target path and the second time interval, send an access result of the access request to the client; and send the change amount of the value of the node in the complete binary tree to the management server end; and a management server, configured to update, in response to receiving the change amount of the value of the node in the complete binary tree sent by at least one metadata server end, the complete binary tree according to the received change amount of the value of the node, and send, in response to receiving a request sent by the client for acquiring the complete binary tree, the complete binary tree to the client.

In an eighth aspect, some embodiments of the present disclosure provide an electronic device. The electronic device includes: one or more processors; and a storage device, configured to store one or more programs. The one or more programs, when executed by the one or more processors, cause the one or more processors to implement the method described in any of the first aspect, the second aspect and the third aspect.

In a ninth aspect, some embodiments of the present disclosure provide a computer readable medium storing a computer program. The program, when executed by a processor, implements the method described in any of the first aspect, the second aspect and the third aspect.

According to the method, apparatus and system for processing data provided by certain embodiments of the present disclosure, the access load of the metadata server can be independently learned, and the dynamic load balancing can be realized in combination with the actual application scenario. The core QPS (queries per second) based on the metadata access is used to fully depict the real-time load condition of a large-scale distributed file system, and thus, the appropriate metadata server is selected to respond to each access request.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure will be described below in detail by combining the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
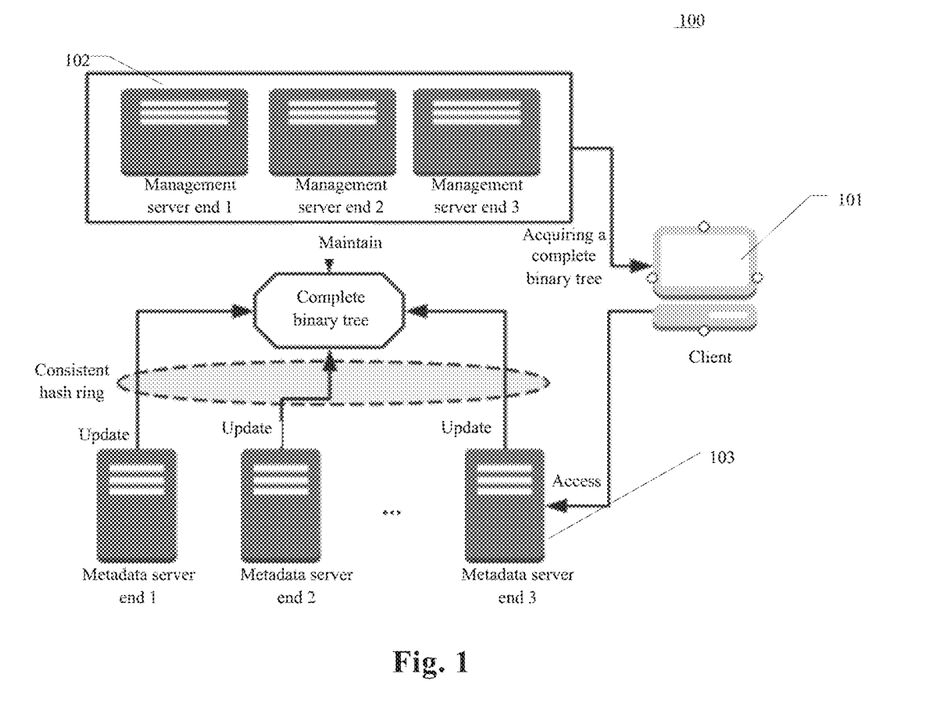
FIG. 1 is a diagram of an example system architecture in which an embodiment of the present disclosure may be applied.

FIG. 1 shows an example system architecture 100 in which an embodiment of a method for processing data or an apparatus for processing data according to the present disclosure may be applied.

As shown in FIG. 1, the system architecture 100 may include a client 101, a management server end 102 and a metadata server end 103. A network serves as a medium providing a communication link between the client 101, the management server end 102 and the metadata server end 103. The network may include various types of connections, for example, wired or wireless communication links, or optical fiber cables.

A user may interact with the management server end 102 and the metadata server end 103 via the network by using the client 101, to receive or send messages. Various communication client applications (e.g., a database application, a webpage browser application, a shopping application, a search application, an instant communication tool, a mailbox client and social platform software) may be installed on the client 101. After receiving an access request of the user, the client 101 may acquire, from the management server end 102, a complete binary tree for recording load information of the metadata server end 103. Then, a metadata server end is selected according to the complete binary tree. Next, the access request is sent to the selected metadata server end 103.

The client 101 may be hardware or software. When being the hardware, the client 101 may be various electronic devices having a display screen and supporting a file access, the electronic devices including, but not limited to, a smart phone, a tablet computer, an e-book reader, an MP3 player (moving picture experts group audio layer III), an MP4 (moving picture experts group audio layer IV) player, a laptop portable computer and a desktop computer. When being the software, the client 101 may be installed in the above-listed electronic devices. The client may be implemented as a plurality of pieces of software or a plurality of software modules (e.g., software or software modules for providing a distributed service), or as a single piece of software or a single software module, which will not be specifically defined here.

The management server end 102 may be a server maintaining the load information of the metadata server end. The management server end 102 may generate the complete binary tree according to load status information (e.g., an access time interval) reported by the metadata server end, and then send the complete binary tree to the client 101.

The metadata server end 103 is responsible for managing the metadata of an entire distributed file system. The metadata is returned after the access request of the client 101 is received, and the change amount of the value of a node in the complete binary tree is determined according to the access time interval. The change amount is then sent to the management server end 102, and the management server end 102 updates the complete binary tree according to the received change amount.

It should be noted that the client 101, the management server end 102 and the metadata server end 103 may be hardware or software. When being the hardware, the client 101, the management server end 102 and the metadata server end 103 may be implemented as a distributed server cluster/distributed device cluster composed of a plurality of servers, or as a single server/single device. When being the software, the client 101, the management server end 102 and the metadata server end 103 may be implemented as a plurality of pieces of software or a plurality of software modules (e.g., software or software modules for providing a distributed service), or as a single piece of software or a single software module, which will not be specifically defined here.

It should be noted that the method for processing data provided by certain embodiments of the present disclosure may be performed by the client 101, the management server end 102 or the metadata server end 103. Correspondingly, the apparatus for processing data may be arranged in the client 101, the management server end 102 or the metadata server end 103, which will not be specifically defined here.

It should be appreciated that the numbers of the clients, the management server ends and the metadata server ends in FIG. 1 are merely illustrative. Any number of clients, management server ends and metadata server ends may be provided based on actual requirements.

Figure 2:
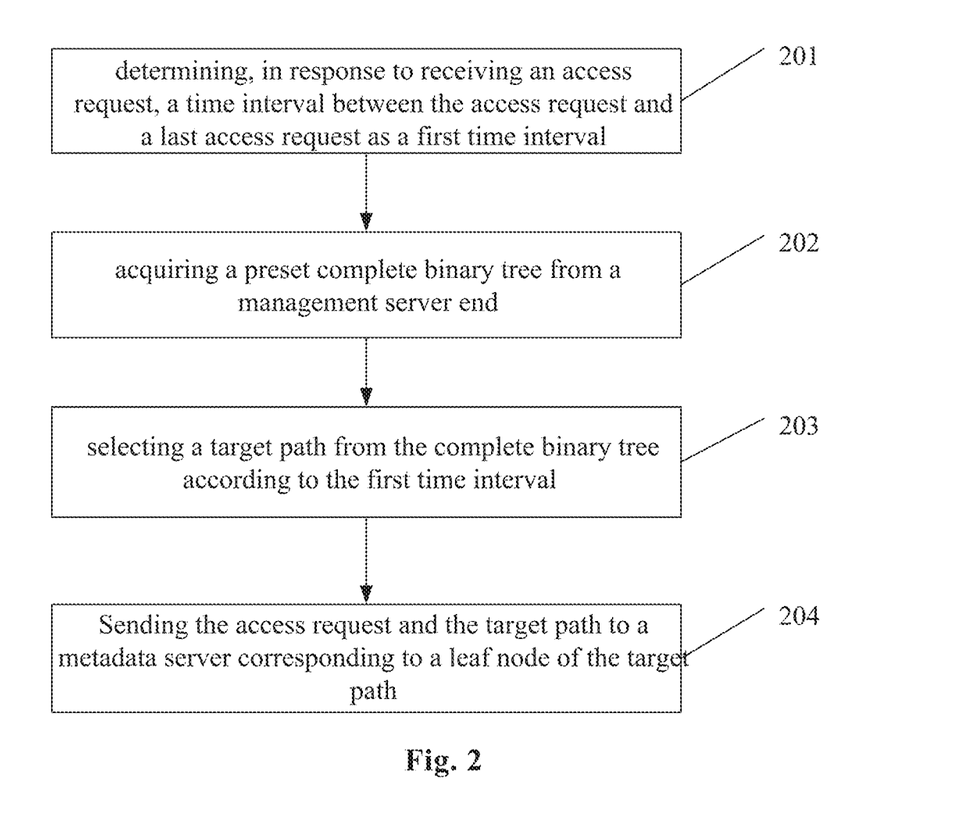
FIG. 2 is a flowchart of an embodiment in which a method for processing data according to the present disclosure is applied to a client.

Further referring to FIG. 2, FIG. 2 illustrates a flow 200 of an embodiment in which a method for processing data according to the present disclosure is applied to a client. The method for processing data includes the following steps 201 to 204.

Step 201, determining, in response to receiving an access request, a time interval between the access request and a last access request as a first time interval.

In this embodiment, an executing body (e.g., the client shown in FIG. 1) of the method for processing data may receive the access request of a user for an access to a file system, and the access request may include information such as a file name, modification time, and a file size. Data in any file system is divided into data and metadata. The data refers to actual data in an ordinary file, and the metadata refers to system data used to describe a characteristic of a file, for example, an access right, a file owner, and distribution information of a file data block. In a cluster file system, the distribution information includes the location of the file on a disk and the location of the disk in a cluster. for operating a file, the user needs to first obtain the metadata of the file, such that the location of the file can be located and the content or related property of the file can be obtained. Each time the access request is received, the client records the time when the access request is received. The time interval of two successive access requests is used as the first time interval.

Step 202, acquiring a preset complete binary tree from a management server end.

In this embodiment, when the client wants to access a metadatabase, it is necessary to acquire the complete binary tree from the management server end, and the complete binary tree is a load model of a metadata server end. The version information of the complete binary tree may first be obtained. If the client detects that the version is identical to the version of a locally stored complete binary tree, a download and an update are not needed. If the versions are different, the latest version of the complete binary tree is downloaded. Alternatively, the version information may be reported by the client, and whether the version reported by the client is the latest is determined by the management server end. If the version is not the latest, the latest version is sent to the client.

Figure 3:
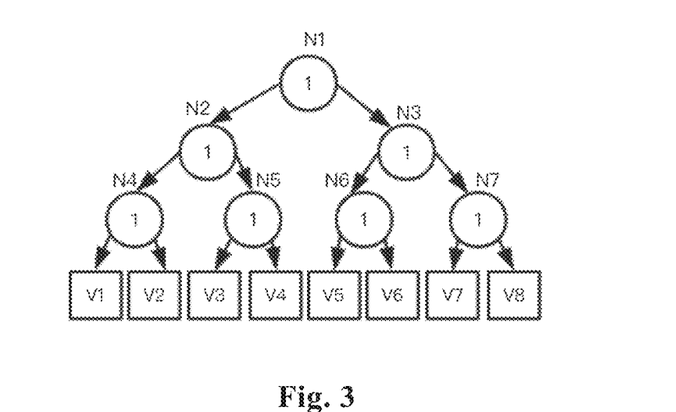
FIG. 3 is a schematic structural diagram of a complete binary tree according to the present disclosure.

For an access to a metadata server, the transmission of specific data is not performed, the load of a single request is mainly concentrated on the rate of the request, that is, QPS (queries per second). The construction of the load model is implemented based on this indicator, and a decision is made according to the size of the interval between two successive requests. A specific load model constructs a complete binary tree based on a number (power of two) of virtual nodes. The virtual nodes are all on leaf nodes at the bottom, and each non-leaf node is used to record the interval between the two successive requests. As shown in FIG. 3, N1-N7 are ordinary nodes, and the value of a non-leaf node is related to the time interval of latest two access requests received by the metadata server. V1-V8 are leaf nodes, which are used to represent virtual nodes. The number of the virtual nodes is the power of two, and in this way the complete binary tree can be constructed.

The client uses the version management to ensure that the latest load model (i.e., complete binary tree) is acquired.

Step 203, selecting a target path from the complete binary tree according to the first time interval.

In this embodiment, the value of each node is initiated as 1, the decision is made from a root node. The specific decision approach may be as follows. The interval (i.e., the first time interval) between the current request and the last access request is compared with the node. If the value is smaller than the value of the node, the comparison is proceed with the left node and a lower child node thereof, otherwise the comparison is proceeded with the right node and a lower child node thereof until a leaf node is reached. Then, the leaf node is mapped to the specific metadata server. After receiving the request of the client, the metadata server records the time interval taken for the request. Then, the metadata server updates the values of nodes of the binary tree in reverse, to subtract a certain ratio value (the ratio value is configurable) of the taken time interval from the value of each node on the target path, and increase the values of all nodes on a symmetric path starting from the root node. The increased value is configured according to another ratio. The description is performed by taking the complete binary tree having 8 virtual nodes that is shown in FIG. 3 as an example:

Decision process (performed by the client): N1-N7 are non-leaf nodes. The time interval of the first access is 0, the value of N1 is 1. The left node N2 is accessed, and the value of N2 is 1. Sequentially, N4 is accessed, and the virtual node V1 is finally obtained.

Update process (performed by the metadata server end): The time interval at which the metadata server corresponding to V1 processes the request is g, and w1*g (w1 is a configured ratio) is respectively subtracted from the values of the nodes N4, N2 and N1 from the bottom to the top. Then, starting from the root node, the value of each node of the symmetric path (i.e., N1→N3→N7) is increased by w2*g (w2 is a configured ratio).

In some alternative implementations of this embodiment, the selecting a target path from the complete binary tree according to the first time interval includes: for a node in the complete binary tree, determining, if the first time interval is smaller than a value of the node, a child node at a predetermined side of the node as a target node; and using the determined target nodes to form the target path. The predetermined side may be the left side or the right side, as long as unified in the system.

Alternatively, a node having a greater value between two child nodes may be selected as the target node to form the target path. In this case, the value of the leaf node may also be updated according to the time interval.

Step 204, sending the access request and the target path to a metadata server corresponding to a leaf node of the target path.

In this embodiment, the virtual node may be mapped to the metadata server according to a previously agreed mapping relationship. For example, the remainder is obtained through dividing the serial number of the virtual node by the number of metadata servers, and the obtained value is the serial number of a target metadata server. The access request is then sent to the computed metadata server end.

In some alternative implementations of this embodiment, sending the access request to the metadata server corresponding to the leaf node of the target path includes: determining, through a preset consistent hash ring, a target metadata server to which the leaf node of the target path is mapped; and sending the access request to the target metadata server. For solving the problem of load balancing in a distributed system, a hash algorithm may be used to make a fixed kind of requests sent to a given server. In this way, each server fixedly processes a kind of requests (and maintains the information of the request), to play the role of the load balancing. However, the scalability of an ordinary remainder hash (e.g., user id % server machine number) algorithm is very poor. When a server machine is newly added or is offline, a large number of mapping relationships between user ids and servers lose efficacy. A consistent hash improves the scalability using a hash ring.

Figure 4:
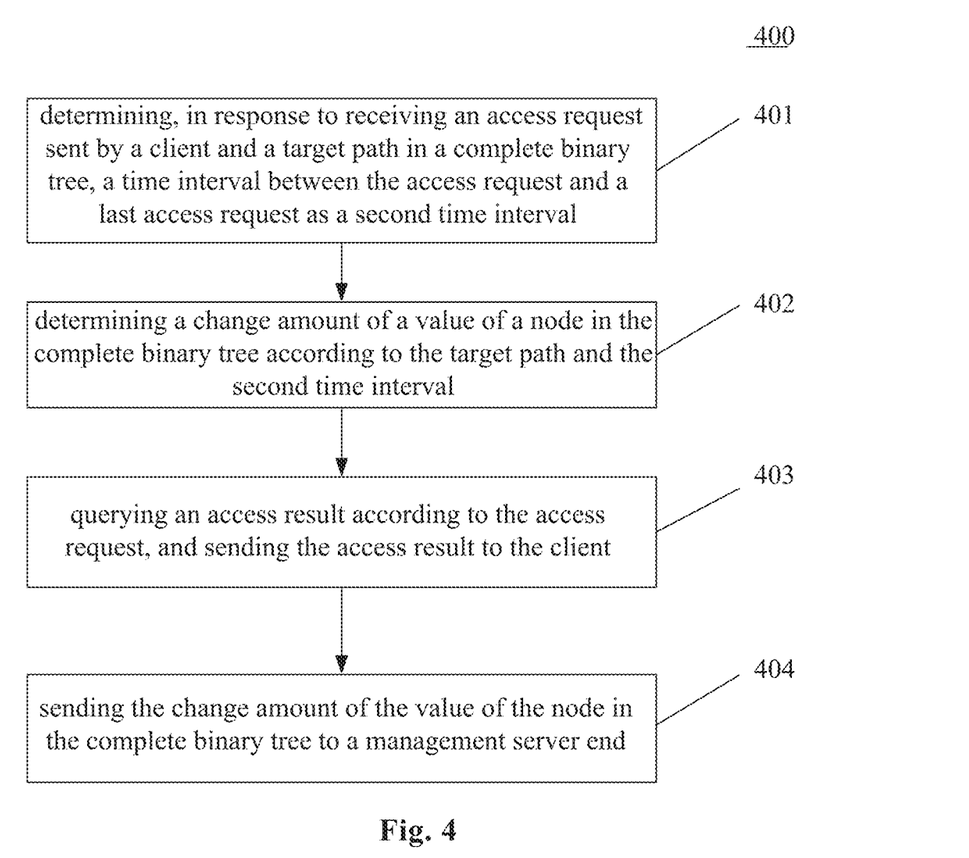
FIG. 4 is a flowchart of an embodiment in which a method for processing data according to the present disclosure is applied to a metadata server end.

Further referring to FIG. 4, FIG. 4 illustrates a flow 400 of an embodiment in which a method for processing data according to the present disclosure is applied to a metadata server end. The method for processing data includes the following steps 401 to 404.

Step 401, determining, in response to receiving an access request sent by a client and a target path in a complete binary tree, a time interval between the access request and a last access request as a second time interval.

In this embodiment, an executing body (e.g., the metadata server end shown in FIG. 1) of the method for processing data may receive the access request sent by the client and the target path in the complete binary tree. The complete binary tree here is the complete binary tree involved in steps 201-204. The metadata server end records the time when the access request is received every time, and determines the time interval between two successive access requests as the second time interval. The second time interval and the first time interval are only to distinguish, in names, the time interval at which the access request is received by the metadata server end from the time interval at which the access request is received by the client, and there is no correlation between the time intervals. A metadata server end may receive an access request from a plurality of clients and perform statistics of the time interval for being accessed without distinguishing the clients.

Step 402, determining a change amount of a value of a node in the complete binary tree according to the target path and the second time interval.

In this embodiment, after receiving the request of the client, the metadata server records the time interval taken for the request, and then updates the value of the node of the binary tree in reverse. In addition to updating the values of the nodes on the target path, the values of the nodes on a symmetric path of the target path may also be updated. For example, a certain ratio value (the ratio value is configurable) of the taken time interval is subtracted from the value of each node on the target path, and the values of all nodes starting from the root node on the symmetric path are increased. The increased value is configured according to another ratio. The symmetric path is a mirror-symmetric path with the root node as the center of symmetry. As shown in FIG. 3, if the target path includes nodes N1, N2, N4, and V1, the symmetric path includes nodes N1, N3, N7, and V8. The purpose of this is to make the number of accesses per unit time of each metadata server more balanced.

The determining a change amount of a value of a node in the complete binary tree according to the target path and the second time interval includes: determining a first weighted value of the second time interval as a decrement of a value of a node on the target path, the first weighted value being a product of the second time interval and a first predetermined weight; and determining a second weighted value of the second time interval as an increment of a value of a node on a symmetric path of the target path, the second weighted value being a product of the second time interval and a second predetermined weight. The description is performed by taking the complete binary tree having 8 virtual nodes that is shown in FIG. 3 as an example:

Decision process (performed by the client): N1-N7 are non-leaf nodes. The time interval of the first access is 0, the value of N1 is 1. The left node N2 is accessed, and the value of N2 is 1. Sequentially, N4 is accessed, and the virtual node V1 is finally obtained.

Update process (performed by the metadata server end): The time interval at which the metadata server corresponding to V1 processes the request is g, and w1*g (w1 is a configured ratio) is sequentially and respectively subtracted from the values of the nodes N4, N2 and N1 from the bottom to the top. Then, starting from the root node, the value of each node of the symmetric path (i.e., N1→N3→N7) is increased by w2*g (w2 is a configured ratio). Here, w1 and w2 may be configured according to the processing capability of the metadata server end. Different metadata server ends may respectively use different w1 and w2, or the same w1 and w2.

Step 403, querying an access result according to the access request, and sending the access result to the client.

In this embodiment, the access result is the metadata of the file indicated by the access request. The access result is returned to the client.

Step 404, sending the change amount of the value of the node in the complete binary tree to a management server end.

In this embodiment, each metadata server end updates the change amount of the value of the node in the complete binary tree after receiving the access request, and then sends the change amount to the management server. The complete binary tree is maintained by the management server end. The corresponding relationship between the node and the change amount may be sent in a predetermined format, for example, nodes N1, N2, N4: −0.2, and nodes N1, N3, N7: +0.4.

Alternatively, the value of the complete binary tree may also be directly updated by the metadata server end. In this way, the metadata server end needs to acquire the latest complete binary tree from the management server end. After the update, the complete binary tree is returned to the management server end.

Figure 5:
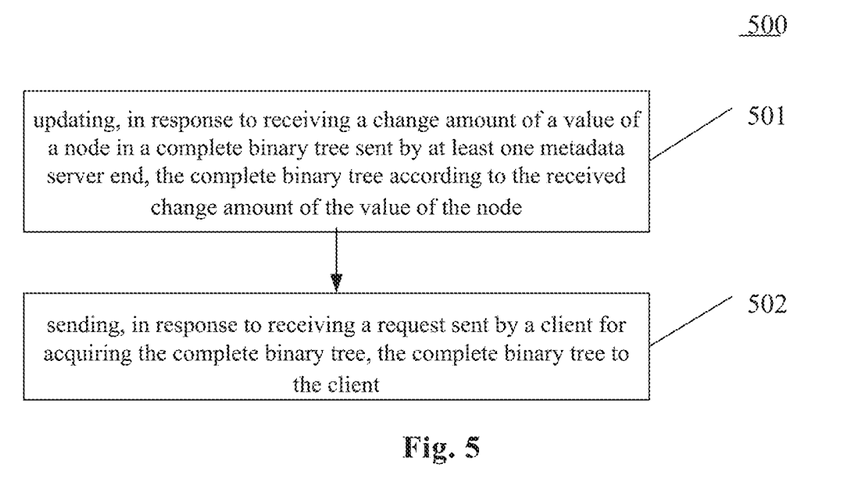
FIG. 5 is a flowchart of an embodiment in which a method for processing data according to the present disclosure is applied to a management server end.

Further referring to FIG. 5, FIG. 5 illustrates a flow 500 of an embodiment in which a method for processing data according to the present disclosure is applied to a management server end. The method for processing data includes the following steps 501 and 502.

Step 501, updating, in response to receiving a change amount of a value of a node in a complete binary tree sent by at least one metadata server end, the complete binary tree according to the received change amount of the value of the node.

In this embodiment, an executing body (e.g., the management server end shown in FIG. 1) of the method for processing data receives the change amount of the value of the node in the complete binary tree from the at least one metadata server end, and then updates the complete binary tree according to the received change amount of the value of the node. For example, each of the values of the nodes of the original complete binary tree is 1. The change amounts sent by a certain metadata server end are received: nodes N1, N2 and N4: −0.2; and nodes N1, N3 and N7: +0.4. Afterwards, the values of the nodes of the complete binary tree are updated to: N1: 1.2, N2: 0.8, N3: 1.4, N4: 0.8, N5: 1, N6: 1, and N7: 1.4. After the change amounts sent by other metadata server ends are received, an update may further be performed on the basis of the last update on the values of the nodes.

Step 502, sending, in response to receiving a request sent by a client for acquiring the complete binary tree, the complete binary tree to the client.

In this embodiment, when the client wants to access a metadata base, the complete binary tree needs to be acquired from the management server end. When receiving the request sent by the client for acquiring the complete binary tree, the management server end may first send the version information of the complete binary tree, and whether an update is performed on the complete binary tree is determined by the client. The client may alternatively send the version information, and whether the latest version is to be sent to the client is determined by the management server end.

Figure 6:
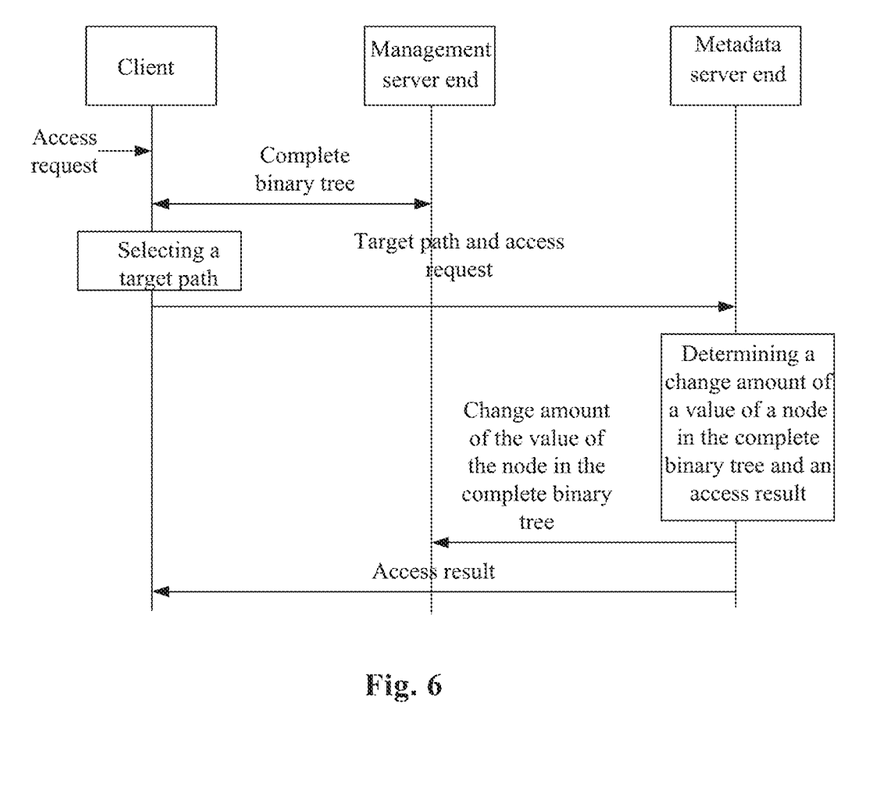
FIG. 6 is a schematic diagram of an application scenario of the method for processing data according to some embodiments of the present disclosure.

Further referring to FIG. 6, FIG. 6 is a schematic diagram of an application scenario of the method for processing data according to this embodiment. In the application scenario of FIG. 6, a user sends an access request through the client, and the client downloads the latest version of the complete binary tree from the management server end. Then, the client looks up the target path from the complete binary tree according to the time interval of the latest two received access requests, and determine the metadata server corresponding to a leaf node of the target path as a target metadata server. The client sends both the access request and the target path to the metadata server end. After receiving the access request, the metadata server end records the time and compares the time with the time at which the access is received for the last time, to determine the time interval. Then, the change amount of the value of a node of the complete binary tree and an access result are determined according to the time interval. Finally, the access result is returned to the client, and the change amount of the value of the node of the complete binary tree is returned to the management server end. The management server end updates the binary tree according to the received change amount of the value of the node of the complete binary tree.

According to the method provided by the above embodiments of the present disclosure, the load model (i.e., the complete binary tree) is constructed based on the core indicator QPS of the metadata access, and the model does not have any training process, and is only used to represent the overall system load level of the current metadata server, which can be easily achieved. Each metadata server end processes the directory tree of the entire file system. There is no problem of subdirectory tree division and dynamic migration, which ensures the security of the metadata, and improves the stability of the metadata server in design. By introducing the virtual nodes and the consistent hash ring, the new addition and the offline of the metadata server have little impact on the overall system, and the system may be appropriately extended according to specific services and load levels.

Figure 7:
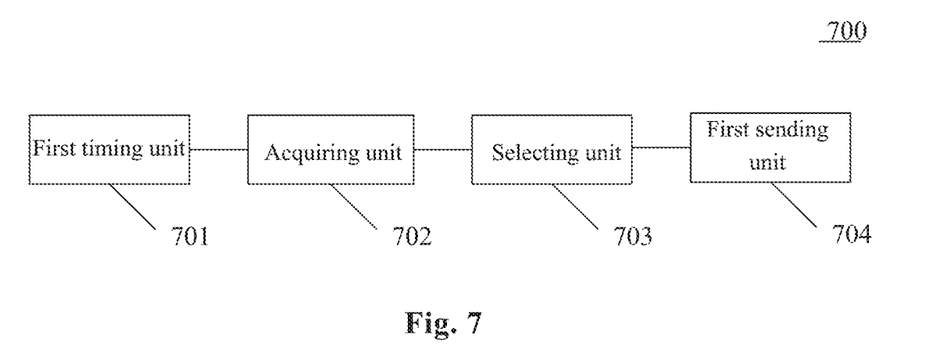
FIG. 7 is a schematic structural diagram of an embodiment in which an apparatus for processing data according to the present disclosure is applied to a client.

Further referring to FIG. 7, as an implementation of the method shown in the above drawings, the present disclosure provides an embodiment in which an apparatus for processing data is applied to a client. The embodiment of the apparatus corresponds to the embodiment of the method shown in FIG. 2, and the apparatus may be applied in various electronic devices.

As shown in FIG. 7, the apparatus 700 for processing data in this embodiment includes: a first timing unit 701, an acquiring unit 702, a selecting unit 703 and a first sending unit 704. The first timing unit 701 is configured to determine, in response to receiving an access request, a time interval between the access request and a last access request as a first time interval. The acquiring unit 702 is configured to acquire a preset complete binary tree from a management server end, a value of a non-leaf node of the complete binary tree being related to a time interval of latest two access requests received by a metadata server, a leaf node being used to represent a virtual node in a distributed system, and the virtual node corresponding to the metadata server. The selecting unit 703 is configured to select a target path from the complete binary tree according to the first time interval. The first sending unit 704 is configured to send the access request and the target path to a metadata server corresponding to a leaf node of the target path.

In this embodiment, for specific processes of the first timing unit 701, the acquiring unit 702, the selecting unit 703 and the first sending unit 704 in the apparatus 700 for processing data, reference may be made to step 201, step 202, step 203 and step 204 in the corresponding embodiment of FIG. 2.

In some alternative implementations of this embodiment, the selecting unit 703 is further configured to: for a node in the complete binary tree, determine, if the first time interval is smaller than a value of the node, a child node at a predetermined side of the node as a target node; and use the determined target node to form the target path.

In some alternative implementations of this embodiment, the first sending unit 704 is further configured to: determine, through a preset consistent hash ring, a target metadata server to which the leaf node of the target path is mapped; and send the access request to the target metadata server.

Figure 8:
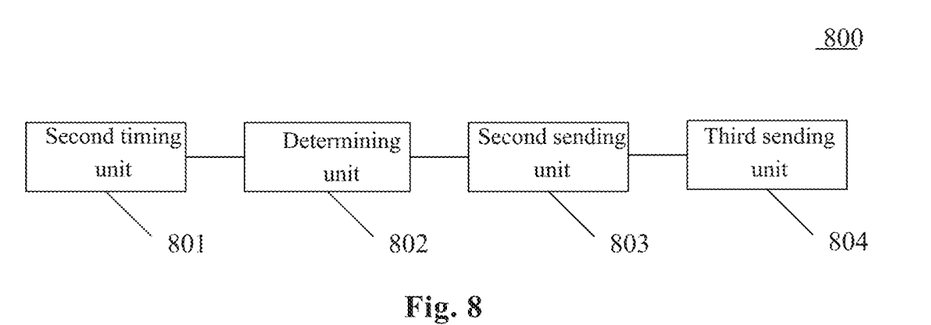
FIG. 8 is a schematic structural diagram of an embodiment in which an apparatus for processing data according to the present disclosure is applied to a metadata server end.

Further referring to FIG. 8, as an implementation of the method shown in the above drawings, the present disclosure provides an embodiment in which an apparatus for processing data is applied to a metadata server end. The embodiment of the apparatus corresponds to the embodiment of the method shown in FIG. 4, and the apparatus may be applied in various electronic devices.

As shown in FIG. 8, the apparatus 800 for processing data in this embodiment includes: a second timing unit 801, a determining unit 802, a second sending unit 803 and a third sending unit 804. The second timing unit 801 is configured to determine, in response to receiving an access request sent by a client and a target path in a complete binary tree, a time interval between the access request and a last access request as a second time interval, a value of a non-leaf node of the complete binary tree being related to a time interval of latest two access requests received by a metadata server, a leaf node being used to represent a virtual node in a distributed system, and the virtual node corresponding to the metadata server. The determining unit 802 is configured to determine a change amount of a value of a node in the complete binary tree according to the target path and the second time interval. The second sending unit 803 is configured to query an access result according to the access request, and send the access result to the client. The third sending unit 804 is configured to send the change amount of the value of the node in the complete binary tree to a management server end.

In this embodiment, for specific processes of the second timing unit 801, the determining unit 802, the second sending unit 803 and the third sending unit 804 in the apparatus 800 for processing data, reference may be made to step 401, step 402, step 403 and step 404 in the corresponding embodiment of FIG. 4.

In some alternative implementations of this embodiment, the determining unit 802 is further configured to: determine a first weighted value of the second time interval as a decrement of a value of a node on the target path, the first weighted value being a product of the second time interval and a first predetermined weight; and determine a second weighted value of the second time interval as an increment of a value of a node on a symmetric path of the target path, the second weighted value being a product of the second time interval and a second predetermined weight.

Figure 9:
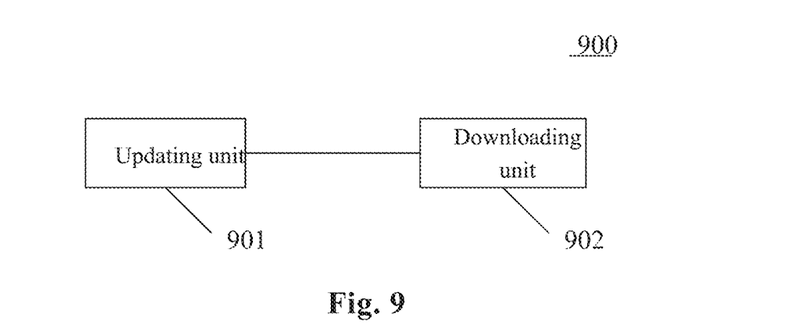
FIG. 9 is a schematic structural diagram of an embodiment in which an apparatus for processing data according to the present disclosure is applied to a management server end.

Further referring to FIG. 9, as an implementation of the method shown in the above drawings, the present disclosure provides an embodiment in which an apparatus for processing data is applied to a management server end. The embodiment of the apparatus corresponds to the embodiment of the method shown in FIG. 5, and the apparatus may be applied in various electronic devices.

As shown in FIG. 9, the apparatus 900 for processing data in this embodiment includes: an updating unit 901 and a downloading unit 902. The updating unit 901 is configured to update, in response to receiving a change amount of a value of a node in a complete binary tree sent by at least one metadata server end, the complete binary tree according to the received change amount of the value of the node, a value of a non-leaf node of the complete binary tree being related to a time interval of latest two access requests received by a metadata server, a leaf node being used to represent a virtual node in a distributed system, and the virtual node corresponding to the metadata server. The downloading unit 902 is configured to send, in response to receiving a request sent by a client for acquiring the complete binary tree, the complete binary tree to the client.

In this embodiment, for specific processes of the updating unit 901 and the downloading unit 902 in the apparatus 900 for processing data, reference may be made to step 501 and step 502 in the corresponding embodiment of FIG. 5.

Figure 10:
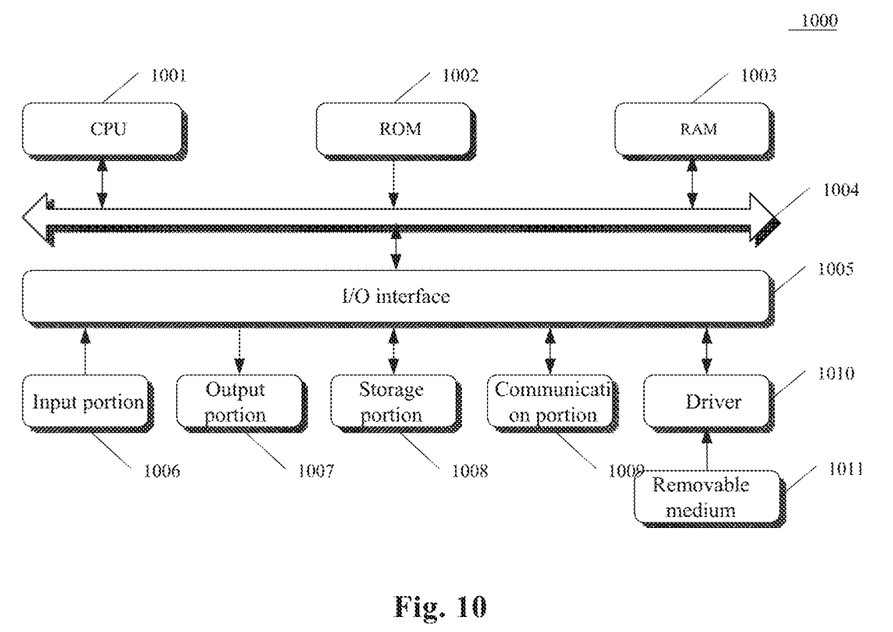
FIG. 10 is a schematic structural diagram of a computer system adapted to implement an electronic device according to embodiments of the present disclosure.

Referring to FIG. 10, FIG. 10 is a schematic structural diagram of a computer system 1000 adapted to implement an electronic device (the electronic device shown in FIG. 1) of some embodiments of the present disclosure. The electronic device shown in FIG. 10 is merely an example, and should not bring any limitations to the functions and the scope of the present disclosure.

As shown in FIG. 10, the computer system 1000 includes a central processing unit (CPU) 1001, which may execute various appropriate actions and processes in accordance with a program stored in a read-only memory (ROM) 1002 or a program loaded into a random access memory (RAM) 1003 from a storage portion 1008. The RAM 1003 also stores various programs and data required by operations of the system 1000. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse, etc.; an output portion 1007 including a cathode ray tube (CRT), a liquid crystal display device (LCD), a speaker, etc.; a storage portion 1008 including a hard disk and the like; and a communication portion 1009 including a network interface card such as a LAN (local area network) card and a modem. The communication portion 1009 performs communication processes via a network such as the Internet. A driver 1010 is also connected to the I/O interface 1005 as required. A removable medium 1011 such as a magnetic disk, an optical disk, a magneto-optical disk, and a semiconductor memory may be installed on the driver 1010, to facilitate the retrieval of a computer program from the removable medium 1011, and the installation thereof on the storage portion 1008 as needed.

In particular, according to some embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 1009, and/or may be installed from the removable medium 1011. The computer program, when executed by the central processing unit (CPU) 1001, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequence shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in certain embodiments of the present disclosure may be implemented by means of software or hardware. The described units may also be provided in a processor. For example, the processor may be described as: a processor comprising a first timing unit, an acquiring unit, a selecting unit and a first sending unit. The names of these units do not in some cases constitute a limitation to such units themselves. For example, the first timing unit may alternatively be described as "a unit for determining, in response to receiving an access request, a time interval between the access request and a last access request as a first time interval."

In another aspect, the present disclosure further provides a computer readable medium. The computer readable medium may be the computer readable medium included in the apparatus described in the above embodiments, or a standalone computer readable medium not assembled into the apparatus. The computer readable medium carries one or more programs. The one or more programs, when executed by the apparatus, cause the apparatus to: determine, in response to receiving an access request, a time interval between the access request and a last access request as a first time interval; acquire a preset complete binary tree from a management server end, a value of a non-leaf node of the complete binary tree being related to a time interval of latest two access requests received by a metadata server, a leaf node being used to represent a virtual node in a distributed system, and the virtual node corresponding to the metadata server; select a target path from the complete binary tree according to the first time interval; and send the access request and the target path to the metadata server corresponding to a leaf node of the target path. Alternatively, the apparatus is caused to determine, in response to receiving an access request sent by a client and a target path in a complete binary tree, a time interval between the access request and a last access request as a second time interval, a value of a non-leaf node of the complete binary tree being related to a time interval of latest two access requests received by a metadata server, a leaf node being used to represent a virtual node in a distributed system, and the virtual node corresponding to the metadata server; determine a change amount of a value of a node in the complete binary tree according to the target path and the second time interval; query an access result according to the access request, and send the access result to the client; and send the change amount of the value of the node in the complete binary tree to a management server end. Alternatively, the apparatus is caused to update, in response to receiving a change amount of a value of a node in a complete binary tree sent by at least one metadata server end, the complete binary tree according to the received change amount of the value of the node, a value of a non-leaf node of the complete binary tree being related to a time interval of latest two access requests received by a metadata server, a leaf node being used to represent a virtual node in a distributed system, and the virtual node corresponding to the metadata server; and send, in response to receiving a request sent by a client for acquiring the complete binary tree, the complete binary tree to the client.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the one or more concepts of the disclosure, for example, technical solutions formed by replacing the features as disclosed in the present disclosure with (but not limited to) technical features with similar functions.

What is claimed is:

1. A method for processing data, applied to a client, the method comprising:
    determining, in response to receiving an access request, a time interval between the access request and a last access request as a first time interval, wherein the access request and the last access request are two successively received requests;
    acquiring a preset complete binary tree from a management server end, wherein a non-leaf node of the complete binary tree comprises a value being related to a time interval of latest two successive access requests received by a metadata server, and a leaf node is used to represent a virtual node in a distributed system, and the virtual node corresponding to the metadata server;
    selecting a target path from the complete binary tree according to the first time interval; and
    sending the access request and the target path to the metadata server corresponding to the leaf node of the target path, wherein the sending the access request to the metadata server corresponding to the leaf node of the target path comprises:
    determining, through a preset consistent hash ring, the target metadata server to which the leaf node of the target path is mapped; and
    sending the access request to the target metadata server.

2. The method according to claim 1, wherein the selecting a target path from the complete binary tree according to the first time interval comprises:
    for a node in the complete binary tree, determining, if the first time interval is smaller than a value of the node, a child node at a predetermined side of the node as a target node; and
    using the determined target node to form the target path.

3. An apparatus for processing data, applied to a client, the apparatus comprising:
    at least one processor; and
    a memory storing instructions, wherein the instructions, when executed by the at least one processor, cause the at least one processor to perform operations, the operations comprising:
    determining, in response to receiving an access request, a time interval between the access request and a last access request as a first time interval, wherein the access request and the last access request are two successively received requests;
    acquiring a preset complete binary tree from a management server end, wherein a value of a non-leaf node of the complete binary tree comprises a value being related to a time interval of latest two successive access requests received by a metadata server, and a leaf node is used to represent a virtual node in a distributed system, and the virtual node corresponding to the metadata server;
    selecting a target path from the complete binary tree according to the first time interval; and sending the access request and the target path to the metadata server corresponding to the leaf node of the target path, wherein the sending the access request to the metadata server corresponding to the leaf node of the target path comprises:

determining, through a preset consistent hash ring, the target metadata server to which the leaf node of the target path is mapped; and sending the access request to the target metadata server.

4. The apparatus according to claim 3, wherein the selecting a target path from the complete binary tree according to the first time interval comprises:

for a node in the complete binary tree, determining, if the first time interval is smaller than a value of the node, a child node at a predetermined side of the node as a target node; and using the determined target node to form the target path.

5. A system for processing data comprising the apparatus of claim 3, the system further comprising:

at least one metadata server comprising a memory and a processor configured to: determine, in response to receiving, from the apparatus, an access request and a target path in a complete binary tree, a second time interval between the access request sent by the apparatus and a last access request received by the metadata server, determine a change amount of a value of a node in the complete binary tree according to the target path and the second time interval, send an access result of the access request to the apparatus; and send the change amount of the value of the node in the complete binary tree to a management server end, wherein sending by the apparatus the access request to the metadata server corresponding to a leaf node of the target path comprises determining, through a preset consistent hash ring, the target metadata server to which the leaf node of the target path is mapped and sending the access request to the at least one metadata server; and the management server comprising a memory and a processor configured to update, in response to receiving the change amount of the value of the node in the complete binary tree sent by the at least one metadata server, the complete binary tree according to the received change amount of the value of the node, and send, in response to receiving a request sent by the apparatus for acquiring the complete binary tree, the complete binary tree to the apparatus.

6. A non-transitory computer readable storage medium, storing a computer program, wherein the program, when executed by a processor, causes the processor to perform operations comprising:

determining, in response to receiving an access request, a time interval between the access request and a last access request as a first time interval, wherein the access request and the last access request are two successively received requests;

acquiring a preset complete binary tree from a management server end, wherein a value of a non-leaf node of the complete binary tree comprises a value being related to a time interval of latest two successive access requests received by a metadata server, and a leaf node is used to represent a virtual node in a distributed system, and the virtual node corresponding to the metadata server;

selecting a target path from the complete binary tree according to the first time interval; and sending the access request and the target path to the metadata server corresponding to the leaf node of the target path, wherein the sending the access request to the metadata server corresponding to the leaf node of the target path comprises:

determining, through a preset consistent hash ring, the target metadata server to which the leaf node of the target path is mapped; and sending the access request to the target metadata server.

* * * * *